United States Patent [19]

Crossland et al.

[11] 4,291,948
[45] Sep. 29, 1981

[54] LIQUID CRYSTAL DISPLAY INCORPORATING POSITIVE AND NEGATIVE SMECTIC MATERIAL

[75] Inventors: William A. Crossland, Harlow; Joseph H. Morrissy, Dunmow; David Coates, Bishop's Stortford, all of England

[73] Assignee: International Standard Electric Corporation, New York, N.Y.

[21] Appl. No.: 955,869

[22] Filed: Oct. 30, 1978

[30] Foreign Application Priority Data

Nov. 10, 1977 [GB] United Kingdom ............... 46819/77
Nov. 10, 1977 [GB] United Kingdom ............... 46820/77
Nov. 10, 1977 [GB] United Kingdom ............... 46821/77

[51] Int. Cl.³ .......................... G02F 1/13; C09K 3/34
[52] U.S. Cl. .................................. 350/340; 350/341; 350/346; 350/349; 350/350 S; 252/299.1
[58] Field of Search ............... 252/299; 350/350 S, 350/346, 340, 341, 349

[56] References Cited

U.S. PATENT DOCUMENTS

| | | | |
|---|---|---|---|
| 3,796,999 | 3/1976 | Kahn | 252/299 |
| 3,960,750 | 6/1976 | Moriyama et al. | 252/299 |
| 3,960,751 | 6/1976 | Moriyama et al. | 252/299 |
| 4,009,934 | 3/1977 | Goodwin et al. | 252/299 |
| 4,040,047 | 8/1977 | Hareng et al. | 350/346 |
| 4,084,884 | 4/1978 | Raynes | 350/341 |
| 4,113,647 | 9/1978 | Coates et al. | 252/299 |
| 4,119,558 | 10/1978 | Coates et al. | 252/299 |
| 4,128,313 | 12/1978 | Cole, Jr. et al. | 350/340 |
| 4,139,273 | 2/1979 | Crossland et al. | 252/299 |
| 4,145,114 | 3/1979 | Coates et al. | 252/299 |
| 4,149,413 | 4/1979 | Gray et al. | 252/299 |
| 4,165,922 | 8/1979 | Morrissy | 350/340 |
| 4,196,974 | 4/1980 | Hareng et al. | 252/299 |
| 4,219,255 | 8/1980 | Raynes | 350/346 |
| 4,227,778 | 10/1980 | Raynes | 350/350 R |

FOREIGN PATENT DOCUMENTS

| | | | |
|---|---|---|---|
| 2104 | 5/1979 | European Pat. Off. | 252/299 |
| 105701 | 5/1974 | German Democratic Rep. | 252/299 |
| 53-27621 | 8/1978 | Japan | 252/299 |
| 1506256 | 4/1978 | United Kingdom . | |
| 1549584 | 8/1979 | United Kingdom | 252/299 |

OTHER PUBLICATIONS

Tani, C., et al., Appl. Phys. Lett., vol 33, No. 4, pp. 275-277, (8/15/78).
Hareng, M., et al., Appl. Phys. Lett., vol. 27, No. 11, pp. 575-576, (1975).
Hareng, M., et al., Appl. Phys. Lett., vol. 25, No. 12, pp. 683-685, (1974).
Taylor, G. N., et al., J. Appl. Phys., vol. 45, No. 10, pp. 4330-4338, (1974).
Constant, J., et al., "Photostable Anthraquinone Pleochroic Dyes", Presented at 7th Intern'l, Liq. Cryst. Conf., Bordeaux, Fr., (Jul. 1978).
Gray, G. W., et al., Mol. Cryst. Liq. Cryst., vol. 37, pp. 157-188, (1976).
Sackmann, H., et al., Mol. Cryst. Liq. Cryst., vol. 21, pp. 239-273, (1973).
Cladis, P. E., et al., J. Appl. Phys., vol. 46, No. 2, pp. 584-599, (1975).

*Primary Examiner*—Teddy S. Gron
*Attorney, Agent, or Firm*—John T. O'Halloran; Thomas N. Twomey

[57] ABSTRACT

A liquid crystal display cell provides more than two contrasting colors that operates in a storage mode which has a positive dielectric anisotropy smectic liquid layer between electroded plates treated to produce parallel homogeneous alignment with a very large tilt angle. The tilt angle can be progressively increased by increasing the strength of an applied alternating potential thereby producing Newtonian colors when viewed through crossed polarizers. When pseudo-homogeneous zero tilt alignment is provided, a pleochroic dye may be mixed with the smectic to provide a color when the layer is in the pseudo-homogeneous alignment state. An applied electric field converts this to homeotropic alignment. When a negative dielectric anisotropy smectic liquid layer is sandwiched between electroded plates treated to induce homeotropic alignment, application of an electric field turns the display from clear (black between crossed polarizers) to milky as the alignment changes from homeotropic towards homogeneous (metastable) degenerating to focal-conic.

14 Claims, 5 Drawing Figures

LIQUID CRYSTAL DISPLAY INCORPORATING POSITIVE AND NEGATIVE SMECTIC MATERIAL

BACKGROUND OF THE INVENTION

This invention relates to liquid crystal display cells, and in particular to such cells filled with smectic materials that exhibit positive and negative dielectric anisotropy.

SUMMARY OF THE INVENTION

According to one embodiment of this invention there is provided an internally electroded liquid crystal display cell having a layer of a smectic material that exhibits positive dielectric anisotropy sandwiched between two electroded plates having electrodes that overlap at least in part, at least one of which plates is transparent, wherein the surfaces of the plates are such that, when the layer is taken into a smectic phase from a less ordered non-smectic phase by cooling in the absence of an applied electric field the layer is caused to assume parallel homogeneous alignment with too large a tilt angle for the formation of focal conic domains observable by optical microscopy in polarized light.

According to another embodiment of this invention there is provided an internally electroded liquid crystal display cell having a layer of a smectic material that exhibits positive dielectric anisotropy in which a pleochroic dye has been dispersed, which layer is sandwiched between two electroded plates having electrodes that overlap at least in part, at least one of which plates is transparent, wherein the surfaces of the plates are such that, when the layer is taken into a smectic phase from a less-ordered non-smectic phase by cooling in the absence of an applied electric field, the layer is caused to assume parallel pseudo-homogeneous, (as hereinafter defined) alignment.

According to still another embodiment of this invention there is provided an internally electroded liquid crystal display cell having a layer of a smectic material that exhibits negative dielectric anisotropy sandwiched between two electroded plates having electrodes that overlap at least in part at least one of which plates is transparent, and wherein the surfaces of the plates are such that, when the layer is taken into a smectic phase from a less-ordered non-smectic phase by cooling in the absence of an applied electric field, the layer is caused to assume substantially homeotropic alignment.

BRIEF DESCRIPTION OF THE DRAWINGS

There follows a description of a smectic liquid crystal display cell embodying this invention. The description refers to the drawings accompanying the Specification in which.

DETAILED DESCRIPTION OF THE INVENTION

Figure 1:
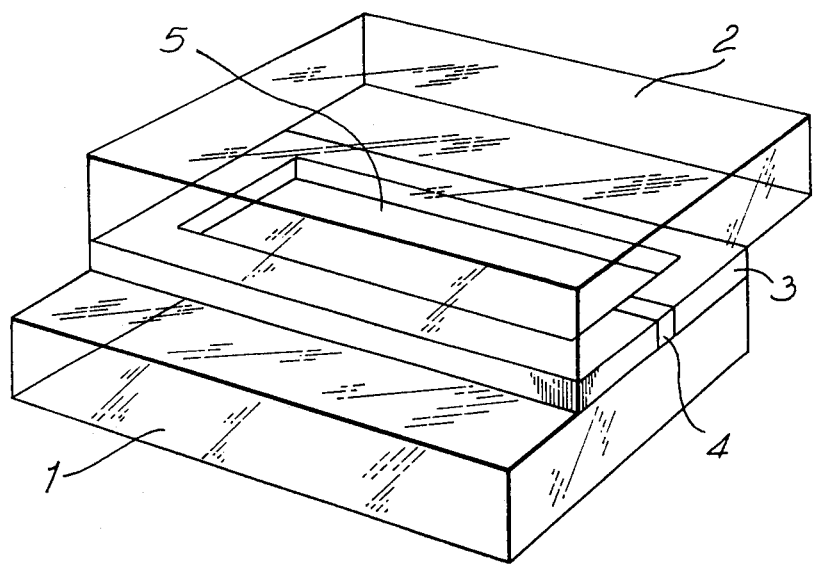
FIG. 1 depicts a schematic perspective view of the cell.

In this specification reference will be made to tilt angle in respect of parallel homogeneous alignment of a liquid crystal layer. For the purposes of this specification this tilt angle is defined as the acute angle between the liquid crystal molecular axis at the surface of the layer and the plane of that surface.

Two glass sheets 1 and 2 are secured together with a perimeter seal 3 to form an envelope for a layer 5 of liquid crystal material according to one embodiment to be hermetically sealed within the cell.

According to another embodiment, the liquid crystal material incorporates a pleochroic dye mixture to be hermetically sealed within the cell. The cell is filled via an aperture formed by an interruption in the perimeter of the seal 3, and, after the cell has been filled, this aperture is sealed off with a plug 4, for instance of indium. Alternatively, if the perimeter seal 3 is a fused glass frit seal, the aperture may be metallized prior to the filling of the cell, in which case the aperture can be sealed off by soldering.

It is preferred to make the perimeter seal 3 by fusing glass frit because, with the appropriate choice of glass frit, the liquid crystal is less liable to contamination by material leached from the seal than is generally the case of seals made of certain other materials such as epoxy resins. A disadvantage of using a glass frit seal is that certain alignment techniques need to be applied before assembly of the cell, but cannot withstand being taken to the temperature needed to fuse the frit.

Before they are secured together, the inwardly facing surfaces of the two sheets are provided with transparent electrodes (not shown) of appropriate layout for the required display to enable an electric field to be applied across the thickness of at least selected portions of the liquid crystal layer. For this purpose portions of the electrodes extend beyond the region of the seal 3 to permit external connection.

According to one embodiment of this invention, the inwardly facing major surface of at least one, and preferably both, of the sheets 1 and 2 are provided with a coating or other surface treatment that will cause the liquid crystal molecules of positive dielectric anisotropy to assume parallel homogeneous alignment when the cell is taken by cooling into a smectic phase from a less ordered non-smectic phase in the absence of any applied electric field. In order to obtain the desired parallel homogeneous molecular alignment it appears necessary to use an alignment method that provides a substantial tilt angle. Thus for instance an oblique evaporation of silicon monoxide at an angle of about 25° to the substrate will, with the nematic phase of 4-cyano-4'-n-octylbiphenyl, produces parallel homogeneous with no tilt angle, but with the smectic phase it produces a focal-conic state with relatively long slender cones (typically with an aspect ratio of about 10 to 1) that are oriented in the alignment direction. The alignment of the smectic material is superficially similar, which is why the smectic alignment has been termed pseudo-homogeneous. These domains are revealed by the appearance of characteristic elliptical patterns when the cell is observed by optical microscopy in polarized light. Similarly oblique evaporation of silicon monoxide at an angle of between 5° and 10° to the substrate produces parallel homogeneous alignment of the nematic phase with a tilt angle of about 25°, whereas with the smectic phase it again produces an aligned focal conic state. However, if the resulting tilt angle is sufficiently increased by further treatment of the evaporated surface with a homeotropic alignment inducing surfactant, it is possible to go through a threshold value of tilt angle beyond which the parallel homogeneous alignment is preserved even in the smectic state. An example of this is provided by treating the 5° to 10° silicon monoxide evaporated layer with a 0.1% solution of hexadecyl-trimethyl-ammonium bromide in methanol. This produces a conoscopically measured tilt angle of 68°.

In the manufacture of a test cell this treatment with the surfactant was applied before the two sheets were secured together with the perimeter seal. The treatment consisted of dipping the sheets into the solution, removing them, and allowing them to dry. In commercial production we would prefer if possible to apply the surfactant after the envelope has been assembled as this would allow the use of a perimeter seal mode of fused glass frit. We contemplate that the assembled cell would be filled with the surfactant, emptied, and the residue allowed to dry on the interior surfaces of the cell. In either instance the cell needs to be assembled so that the alignment directions are parallel having particular regard to tilt angle.

Figure 2:
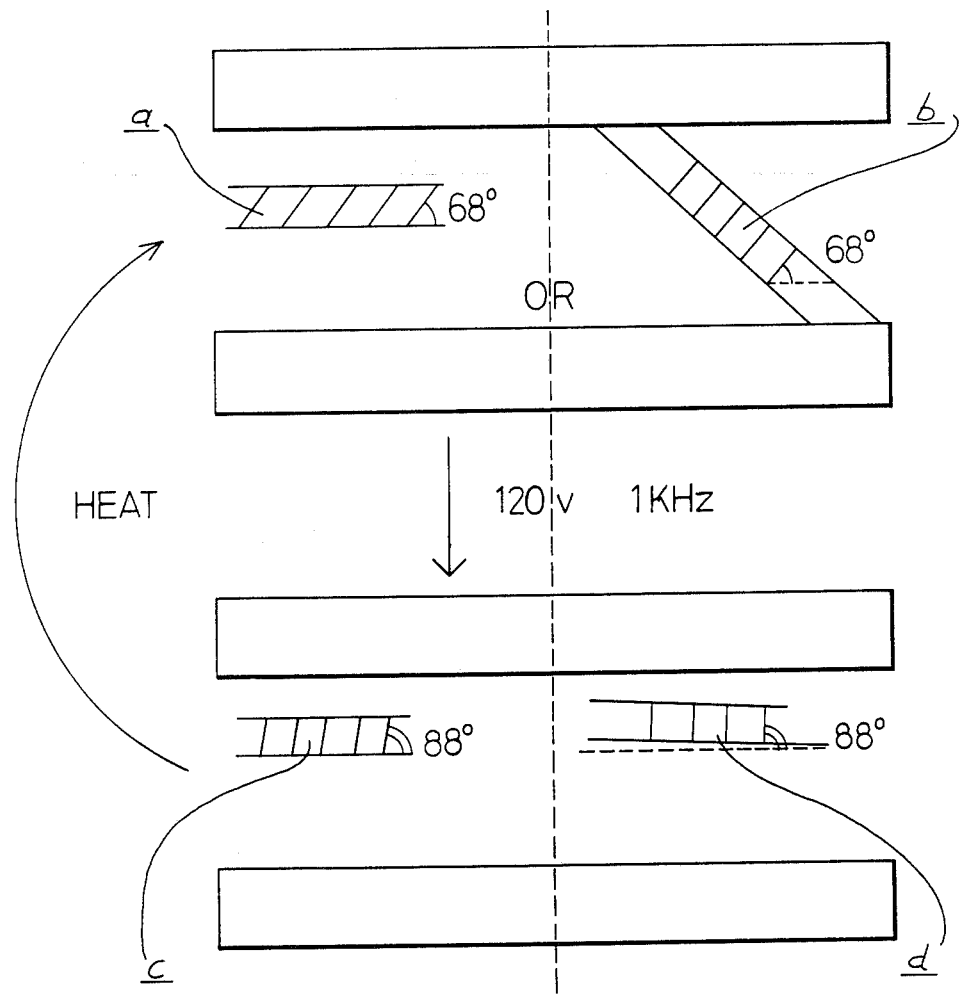
FIG. 2 depicts diagrammatically the two extreme types of state that the cell can assume according to one embodiment of this invention.
Figure 3:
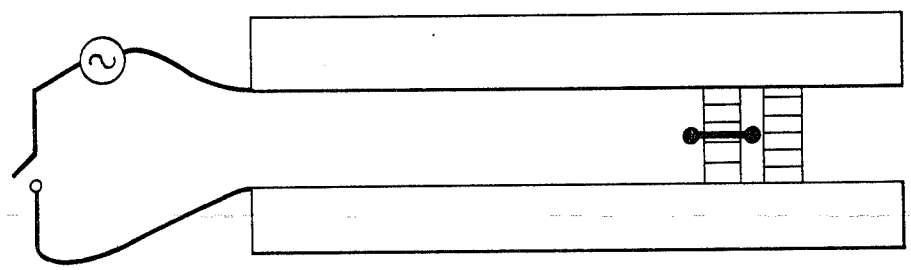
FIG. 3 depicts diagrammatically the two types of stable state that regions of the cell may assume according to another embodiment of this invention.
Figure 3:
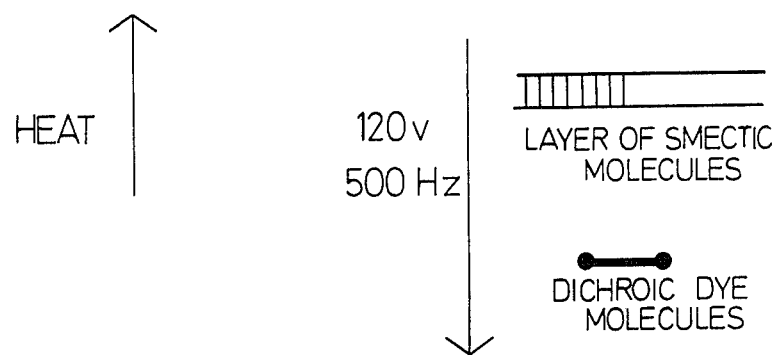
Figure 3:
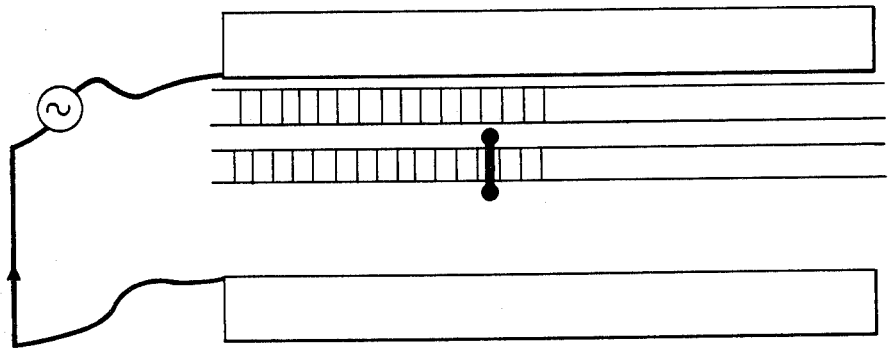

The conoscopic measurement of tilt angle has not revealed whether the tilt is due to the molecules tilting in the smectic layers with the layers themselves being parallel with the glass sheets (i.e. pseudo smectic C as depicted at a in FIG. 2, or whether the molecules are normal to the layers and the layers tilted as depicted at b. However, more recent tests using a neutron scattering technique appear to indicate that with this material it is the smectic layers that are tilted. (FIGS. 2b and d). If a gradually increasing alternating electric field is applied across the cell the tilt angle, as observed by its conoscopic figure, gradually increases to a limiting value of about 88° (i.e. substantially homeotropic alignment as depicted at c or d in FIG. 2.) Preferably the excitation frequency is about 1 KHz because below about 800 Hz the conoscopic figure appears diffuse, probably as a result of some electro-hydrodynamic instability.

When viewed in transmission between crossed polarizers the cell appears colored, and is at a maximum when the alignment direction is mid-way between the two polarization directions. To obtain an even color over the whole surface of the cell the thickness of the liquid crystal layer needs to be very uniform. With a 20 μm thickness layer the cell appears a brown-yellow when observed normal to the glass surface. This agrees with the theoretical retardation of 450 nm for a 20 micron thick liquid crystal aligned at 68° from the glass surfaces and of birefringence $n_o=1.52$, $n_e=1.675$ (quoted indices for 4-cyano-4'-n-octylbiphenyl). The application of the alternating field changes the appearance through yellows, white, and greys to black as the applied voltage is progressively increased to about 150–180 volts r.m.s. By choosing a different thickness of liquid crystal layer it would be possible to arrange for the cells to have different initial colors. In particular thicker cells will start at a higher order color in the Newton spectrum, and thus be able to be swept through a greater range of colors. For instance a cell with a 30 micron thick liquid crystal layer will initially appear blue. Cells of the same thickness can also be arranged to exhibit different colors by the use of different smectic materials having different birefringences, or by the use of different alignment techniques producing different initial tilt angles.

When the tilt is increased from the initial value it is found that the increase is sustained after removal of the exciting field. If the tilt angle is less than maximum the tilt angle can be increased still further by the application of a stronger exciting field. Therefore it is possible by suitable switching to provide a display with more than two contrasting colors. The cell is switched back to the original lower limit of tilt angle by heating it into the nematic phase out of the smectic phase, then allowing it to cool again.

Selected portions of the display can have their tilt angle reduced in this way by the use of localized heating. This can be provided by intensity modulation of an imaged laser beam as it is scanned over the surface of the cell. For this purpose the wavelength of the laser would be chosen so that it is absorbed either by the liquid crystal or by material dissolved in or adjacent to the liquid crystal, such as the material of one of the electrode layers.

The above described cell is capable of being switched in only one direction by the application of an alternating electric potential, while thermal cycling is used for switching in the opposite direction. However, certain smectics have the property of exhibiting a cross-over frequency effect in which the material exhibits positive dielectric anisotropy at low frequencies beneath the cross-over frequency and negative dielectric anisotropy at higher frequencies above the cross-over frequency. With such materials electric switching in both directions is possible. One example of such a material is given by 4-n-pentylphenyl 2'-chloro-4'-(6-n-hexyl-2-naphthoyloxy)benzoate

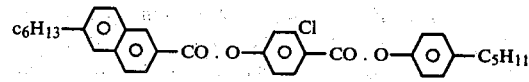

a monotropic liquid crystal with the following phase transition temperatures, C—N, 68.6° C.; [$S_A$-N, 53.5° C.]; N-I, 178.9° C.

The following table shows that with this material the cross-over effect also exists in the nematic phase. On cooling the material from the nematic phase into the smectic phase this cross-over effect persists, but at much higher threshold voltages.

| | Temperature | Cross-Over Frequency | Switching Voltage Applied |
|---|---|---|---|
| | 77° C. | 29 KHz | 22V |
| | 72° | 20 KHz | 22V |
| | 67° | 13 KHz | 22V |
| | 65° | 11 KHz | 22V |
| | 63° | 9.8 KHz | 18V |
| N | 61° | 7.2 KHz | 22V |
| | 59° | 6.2 KHz | 21.1V |
| | 57 | 5.5 KHz | 20.8V |
| | 55 | 4.8 KHz | 20.2V |
| | 54.5 | 4.6 KHz | 20.4V |
| | 54.0 | 4.6 KHz | 20.1V |
| $S_A$—N | 53.5 | 4.2 KHz | 78V |
| | 53.2 | 4.2 KHz | 112V |
| | 52.0= | 4.2 KHz | 182V |
| $S_A$ | 50.0 | 3.9 KHz | 204V |

A cell of the same basic construction as that described above, filled with this material (instead of the other liquid crystal material previously referred to) and maintained at 52° C. can have the tilt angle of its liquid crystal layer increased by the application of an alternating electric potential at a frequency beneath 4.2 KHz, and then have the tilt angle reduced to its lower limit again by the application of an alternating electric potential at a frequency above 4.2 KHz.

According to another embodiment of this invention the inwardly facing major surface of at least one, and preferably both, of the sheets 1 and 2 of FIG. 1 are provided with a coating or other surface treatment that will cause the liquid crystal molecules to assume pseudo-homogeneous alignment when the cell is taken by cooling into a smectic phase from a less ordered non-smectic phase in the absence of any electric field applied across the thickness of the layer.

In this embodiment the necessary alignment surfaces are made by the oblique evaporation of silicon monoxide, and this will satisfactorily withstand firing temperatures in the region 450°–500° C. Therefore before the sheets 1 and 2 are assembled their inwardly facing surfaces are coated with silicon monoxide alignment layers evaporated at an angle of about 25° to the substrate so as to produce pseudo-homogeneous parallel alignment without a tilt angle.

The cell is next assembled with the alignment directions of the two sheets parallel with each other, and then the perimeter seal 3 is made by fusing the glass frit. At this stage the cell is ready for filling. A particular example of a suitable smectic A filling is 4-cyano-4'-n-octylbiphenyl. In order to make a red display a pleochroic azo dye may be added to the smectic. For certain applications where a blue display is desired the azo dye may be replaced with a pleochroic anthraquinone dye. A typical filling used approximately 1.3% of the blue dichroic dye 1-(4'-butyloxyaniline)-4-hydroxyanthraquinone together with approximately 0.05% of Waxoline Yellow A. The Waxoline Yellow, which is an isotropic dye, is added to compensate the residual blue of the display in its homeotropic state caused by the ordering within the smectic host being less than 100%. The presence of the yellow converts this residual blue to a substantially neutral grey. The optical density of the grey is relatively slight so that by eye its appearance is scarcely distinguishable from transparent.

The cell may be set into its pseudo-homogeneous state, in which it appears blue, by heating the cell to cause the filling to go through a phase change from the smectic phase to a less ordered phase, and then allowing the cell to cool again back to the smectic phase in the absence of an applied field. To convert the portion of the cell lying between the electrodes into the homeotropic state, in which it appears as substantially neutral grey, an electric field of suitable field strength and frequency is applied between the electrodes. In the case of a cell with a 20 $\mu$m thick smectic layer the application of 180 volts 500 Hz alternating potential caused the cell to switch after a delay of about 0.1 sec. and with a rise-time (10 to 90%) of about 0.3 secs. This was with the device at a temperature of between 17° and 20° C. The response time is very temperature dependent and also frequency dependent. By reducing the frequency to 30 Hz the delay time was more than halved and the rise time reduced by a factor of about four.

Since the cell is switched into the homeotropic state by the action of heat selective switching into the homeotropic state can be achieved by the use of localized heating, such as that provided by the intensity modulation of an imaged laser beam as it is scanned over the surface of the cell. For this purpose the wavelength of the laser would be chosen so that it is absorbed either by the liquid crystal medium and its added dye or by other material added to the smectic material, or by material adjacent the liquid crystal, such as the material of one of the electrode layers.

It has been found that a cell with some portions in one state and the remainder in the other state will remain for long periods of time without apparent degradation, and hence it is believed that the storage is indefinite.

In another embodiment of this invention a liquid crystal display is fabricated incorporating a smectic liquid crystal material exhibiting a negative dielectric anisotrophy.

The inwardly facing major surface of at least one, and preferably both, of the sheets 1 and 2 of FIG. 1 are provided with a coating or other surface treatment that will cause the liquid crystal molecules to assume substantially homeotropic alignment when it is taken by cooling into a smectic phase from a less ordered non-smectic phase in in the absence of any electric field applied across the thickness of the layer.

Figure 4:
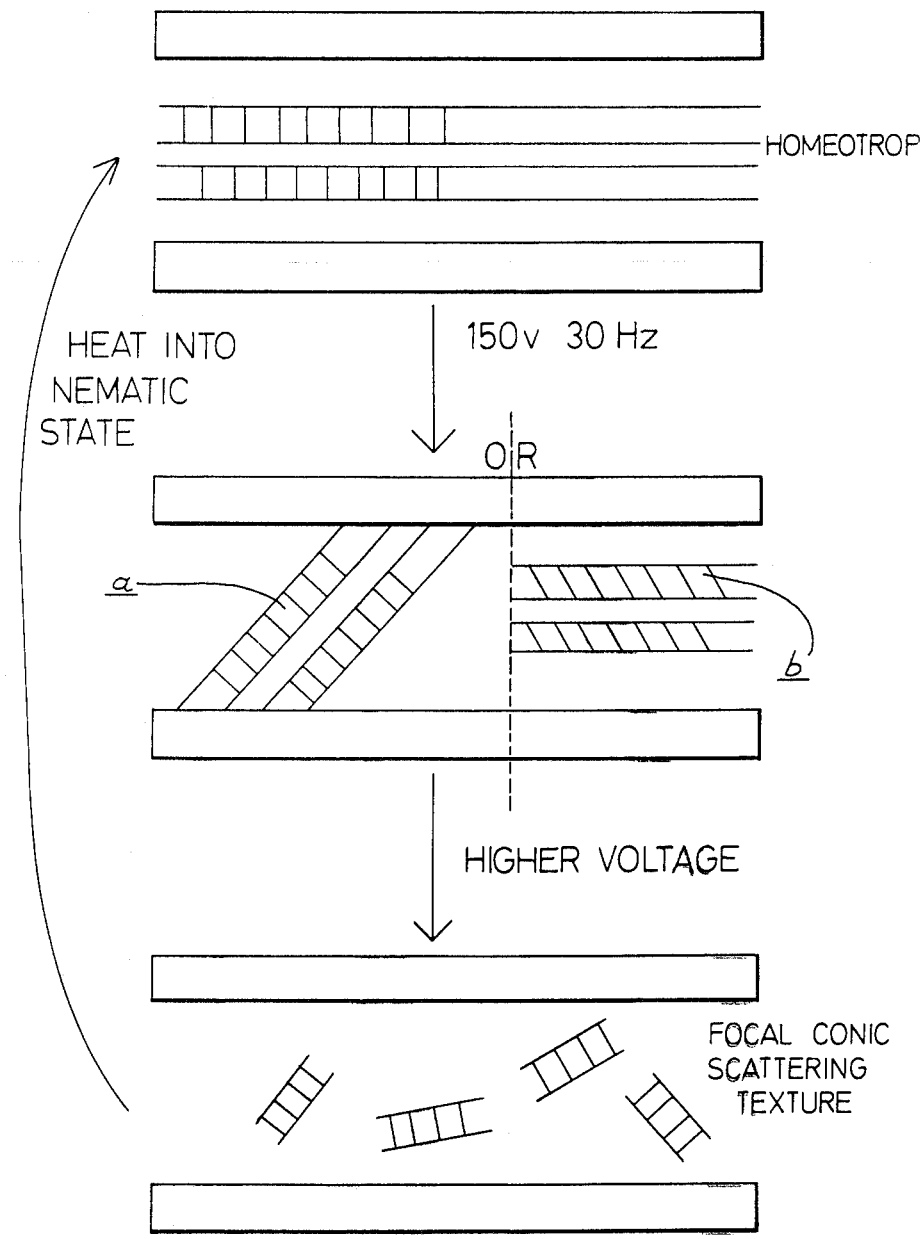
FIG. 4 depicts diagrammatically the two types of stable state and the intermediate metastable state that regions of the cell may assume.

A preferred surface treatment is that provided by coating the glass surfaces with lecithin or hexadecyltrimethyl ammonium bromide solutions. If a fused frit perimeter seal is used for the cell, as is generally preferred on account of its inertness, this surface treatment is applied after firing of the frit by first filling the assembled cell with the required solution and then draining it. Then the cell is filled with a suitable smectic material. This may be for instance 4-octyloxyphenyl trans-4-butylcyclohexyl-1-carboxylate, which has a small negative dielectric anisotropy, and is a smectic A material in the temperature range 28° C. to 49.1° C. Tests with this material in a 20 $\mu$m thick cell revealed that, in the region of overlap between electrodes, this display went from clear to a transient schlieren texture as a 30 Hz signal voltage was increased to the region of 150 volts. This appearance is believed to be produced by a tilting of the smectic layers as diagrammatically illustrated at a in FIG. 4, or it may be that the field induces a pseudo smectic C phase as diagrammatically illustrated at b. Whichever of these two is the correct interpretation, it seems that the arrangement is very metastable, and even a slight increase in field strength induces the formation of focal-conic domains. At a certain threshold voltage the spread of these domains is very rapid and the cell assumes a milky appearance which is not attributable to any form of dynamic scattering effect. An increase in signal frequency was observed to increase the switching threshold voltage.

If the cell is placed between crossed polarizers the transition is more pronounced. Initially the display is black. When the metastable state is reached the domains of the schlieren texture show substantially the same Newtonian fringe color but with different saturations according to the orientation of the domains with respect to the principle axes of the polarizers. In some cases the schlieren texture is too transient to be detected. Then, when the focal-conic domain generation threshold is reached, the display appears birefringent.

The focal-conic regions can be restored to homeotropic alignment by heating the cell sufficiently to go through the smectic-nematic phase change. The focal-conic structure is not sustained in the nematic phase and hence, when the cell is cooled sufficiently to cause the smectic phase to be restored, it will be restored in homeotropic alignment provided that, at that time, there is no applied electric field.

Since the cell is switched into the homeotropic state by the action of heat selective switching into the homeotropic state can be achieved by the use of localized heating as noted above. This may be achieved by the intensity modulation of an imaged laser beam as it is scanned over the surface of the cell. For this purpose the wavelength of the laser would be chosen so that it is absorbed either by the liquid crystal medium or by a material dissolved in or adjacent to it, such as the material of one of the electrode layers.

It has been found that a cell with some portions in the homeotropic alignment state and the remainder in the focal-conic state will remain for long periods without apparent degradation, and hence it is believed that the storage is indefinite.

It is believed that the schlieren textured appearance of the metastable state can be eliminated by providing a unidirectional bias to the substantially homeotropic alignment so that it produces a tilt angle of slightly less than 90°. Provided that this tilt angle is in the same direction over the whole surface, the application of the alternating potential will cause all the smectic molecules to begin to lie over in the same direction, instead of in random directions. This bias might be provided by first treating one of the surfaces so that it would, at least weakly, tend to promote homogeneous alignment of a nematic phase in a particular direction, and then covering the treated surface with a suitable thickness of coating that tends to promote homeotropic alignment.

The above described cell is capable of being switched in only one direction by the application of an alternating electric potential, while thermal cycling is used for switching in the opposite direction. As previously stated, certain smectics have the property of exhibiting a cross-over frequency effect in which the material exhibits positive dielectric anisotropy at low frequencies beneath the cross-over frequency, and negative dielectric anisotropy at higher frequencies above the cross-over frequency. With such materials electric switching in both directions is possible. One example of such a material as noted above, is given by 4-n-pentylphenyl 2'-chloro-4'-(6-n-hexyl-2-naphthoyloxy)benzoate.

A cell of the same basic construction as that described above filled with this material (instead of the other liquid crystal material previously referred to) and maintained at 52° C. can be switched from substantially homeotropic alignment to focal-conic by the application of an alternating electric potential at a frequency above 4.2 KHz, and then can be switched back to substantially homeotropic alignment again by the application of an alternating electric potential at a frequency beneath 4.2 KHz.

Figure 5:
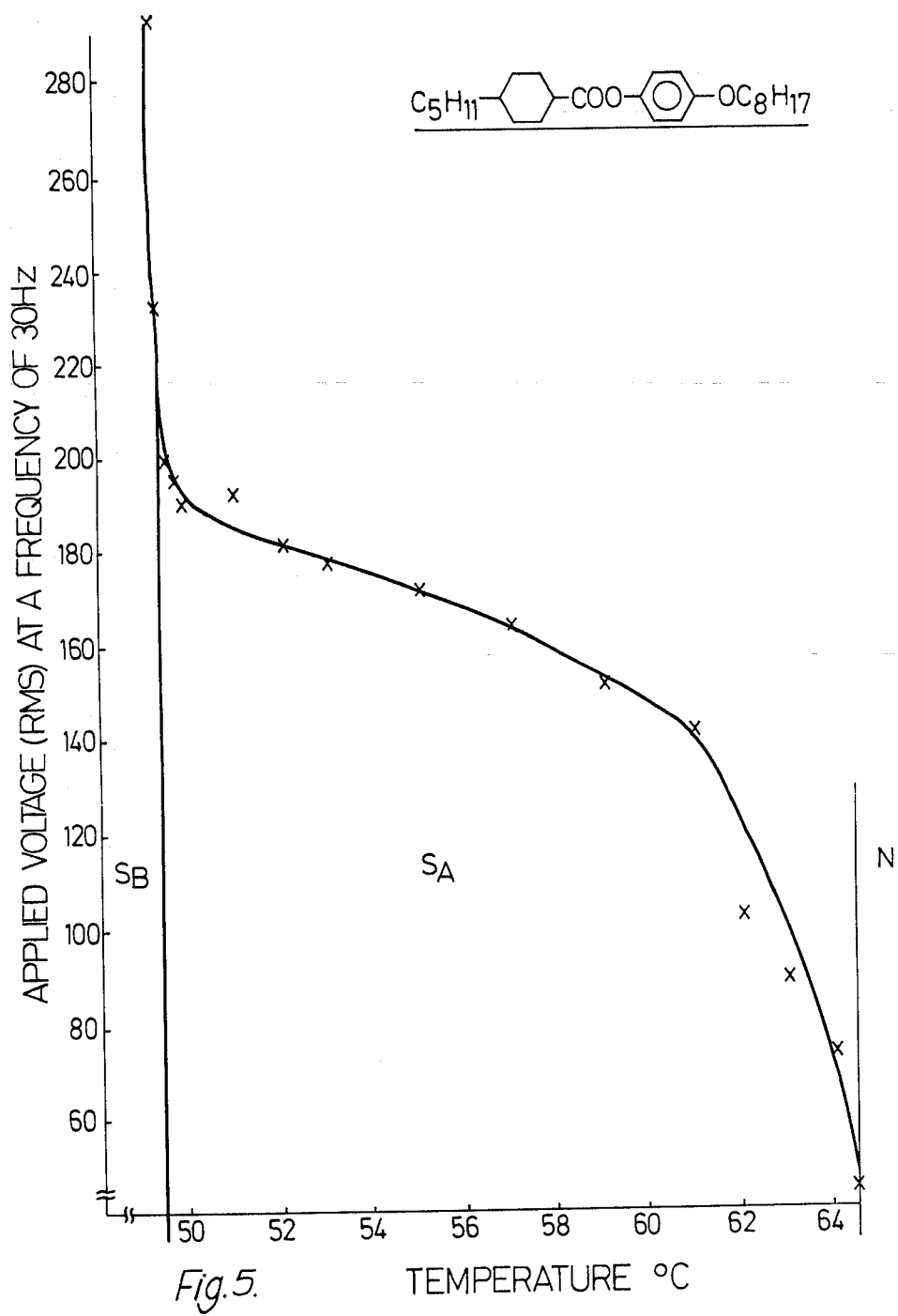
FIG. 5 is a graph showing, for a particular smectic composition, how, at a particular frequency, the switching threshold voltage varies with temperature.

Both smectic materials so far exemplified above have been smectics exhibiting an $S_A$ phase. It is to be noted, however, that a corresponding switching operation can be obtained with a cell containing a $S_B$ phase. An example of such a material is given by 4-n-octyloxyphenyl trans-4-n-pentylcyclohexyl-1-carboxylate, an enantiotropic liquid crystal with the following phase transition temperatures, $C-S_V$, $\sim 42°$ C.; $S_B-S_A$, 49.4° C.; $S_A$-N, 64.6° C.; N-I 79° C. FIG. 5 depicts how the switching threshold voltage at a frequency of 30 Hz varies with temperature for a cell having a 20 micron thick layer of this material. With this material the substantially homeotropic alignment is restored by thermal cycling.

The appearance of the cell may be modified according to the above teaching by incorporating a pleochroic dye with the smectic material. For example approximately 1.3% of the dye 1-(4'Butyloxyaniline)-4-hydroxyanthragninone together with approximately 0.05% of Waxoline Yellow A. When the cell is in the focal conic state the color of the pleochroic dye is shown because of the substantially random orientation of the molecules in this state.

Although the foregoing specific description has related to experiments with specific smectic materials it is to be understood that the invention is not limited to the use of such specific materials. Furthermore although only a smectic A material has been exemplified for certain embodiments, it is expected that smectic B materials can be made to work in the same way but at increased voltages, similarly other suitable smectic classes may also work, provided that such materials exhibit the appropriate dielectric anisotropy.

While we have described above the principles of our invention in connection with specific apparatus it is to be clearly understood that this description is made only by way of example and not as a limitation to the scope of our invention as set forth in the objects thereof and in the accompanying claims.

We claim:

1. An internally electroded liquid crystal display cell comprising a layer of smectic material that exhibits positive dielectric anisotropy sandwiched between two electroded plates having electrodes that overlap at least in part, at least one of which plates is transparent, wherein at least one surface of the plates is such that when the layer is taken into a smectic phase from a less ordered non-smectic phase by cooling in the absence of an applied electric field the layer is caused to assume parallel homogeneous alignment having a non-zero tilt angle, said surface provided by an oblique evaporation performed under conditions which promote parallel homogeneous alignment with a non-zero tilt angle wherein said surface is further treated with a homeotropic alignment inducing surfactant to increase said tilt angle.

2. The display cell as claimed in claim 1 wherein the surfactant is hexadecyl-trimethylammonium-bromide.

3. A display cell as claimed in claim 1 wherein the layer of smectic material is a layer of material that in its smectic phase exhibits a cross-over frequency above which it exhibits negative dielectric anisotropy and beneath which it exhibits positive dielectric anisotropy.

4. The display as claimed in claim 1 wherein said smectic material comprises 4-cyano-4'-n-octylbiphenyl.

5. The display cell as claimed in claim 1 wherein the smectic material is a material that exhibits only positive dielectric anisotropy.

6. An internally electroded liquid crystal display cell comprising a layer of smectic material that exhibits positive dielectric anisotropy sandwiched between two electroded plates having electrodes that overlap at least in part, at least one of which plates is transparent, wherein at least one surface of the plates is such that when the layer is taken into a smectic phase from a less ordered non-smectic phase by cooling in the absence of an applied electric field the layer is caused to assume parallel homogeneous alignment and wherein the layer of smectic material is a layer of material that in its smectic phase exhibits a cross-over frequency above which it exhibits negative dielectric anisotropy and beneath which it exhibits positive dielectric anisotropy, and wherein said smectic material comprises 4-n-pentylphenyl-2'-chloro-4'-(6-n-hexyl-2-naphthoyloxy)benzoate.

7. An internally electroded liquid crystal display cell comprising a layer of smectic material that exhibits positive dielectric anisotropy in which a pleochroic dye has been dispersed, which layer is sandwiched between two electroded plates having electrodes that overlap at least in part, at least one of which plates is transparent, wherein at least one surface of the plates is such that when the layer is taken into a smectic phase from a less-ordered non-smectic phase by cooling in the absence of an applied electric field, the layer is caused to assume parallel pseudo-homogeneous alignment wherein said surface of the plates that causes said assumption of parallel pseudo-homogeneous alignment is provided by material deposited by olique evaporation, wherein said pleochroic dye comprises 1-(4'-butyloxyaniline)-4-hydroxy-anthraquinone together with an isotropic dye.

8. An internally electroded liquid crystal display cell comprising a layer of smectic material that exhibits negative dielectric anisotropy sandwiched between two electroded plates having electrodes that overlap at least in part at least one of which plates is transparent, and wherein at least one surface of the plates is such that, when the layer is taken into a smectic phase from a less-ordered non-smectic phase by cooling it in the absence of an applied electric field, the layer is caused to assume substantially homeotropic alignment with too large a tilt angle for the formation of focal conic domains observable by optical microscopy in polarized light.

9. The display cell as claimed in claim 8 wherein both plates of the cell are transparent and the liquid crystal layer is located between crossed polarizers.

10. The display cell as claimed in claim 8 or 9 wherein the layer of smectic material includes a pleochroic dye.

11. A display cell as claimed in claim 8 or 9 wherein the layer of smectic material is a layer of material that in its smectic phase exhibits a cross-over frequency above which it exhibits negative dielectric anisotropy and beneath which it exhibits positive dielectric anisotropy.

12. An internally electroded liquid crystal display cell comprising a layer of smectic material that exhibits negative dielectric anisotropy sandwiched between two electroded plates having electrodes that overlap at least in part, at least one of which plates is transparent and wherein at least one surface of the plate is such that when the layer is taken into a smectic phase from a less ordered non-smectic phase by cooling it in the absence of an applied electric field, the layer is caused to assume substantially homeotropic alignment, and wherein said smectic material comprises 4-octyloxyphenyl trans-4-butyl-cyclohexyl-1-carboxylate.

13. An internally electroded liquid crystal display cell comprising a layer of smectic material that exhibits negative dielectric anisotropy sandwiched between two electroded plates having electrodes that overlap at least in part, at least one of which plates is transparent and wherein at least one surface of the plate is such that, when the layer is taken into a smectic phase from a less ordered non-smectic phase by cooling it in the absence of an applied electric field, the layer is caused to assume substantially homeotropic alignment wherein said smectic material comprises 4-n-octyloxyphenyl trans-4-n-pentylcyclohexyl-1-carboxylate.

14. The display cell as claimed in claim 8 wherein said smectic material is a smectic B material.

* * * * *